United States Patent Office

3,458,493
Patented July 29, 1969

3,458,493
CATALYST COMPRISING A NICKEL COMPONENT, ORGANOMETALLIC, OR LiAlH₄ AND AN ARYL-SUBSTITUTED HALOALKANE OR HALOGEN SUBSTITUTED ALKENE AND PROCESS FOR POLYMERIZING 1,3-BUTADIENE THEREWITH
Rudolf H. Gaeth and James D. Brown, Bartlesville, Okla., assignors to Phillips Petroleum Company, a corporation of Delaware
No Drawing. Filed Oct. 26, 1966, Ser. No. 589,509
Int. Cl. C08d 1/14; B01j 11/84
U.S. Cl. 260—94.3
10 Claims

ABSTRACT OF THE DISCLOSURE

High cis, low vinyl, polybutadienes are produced by employing a catalyst composition of an aryl-substituted haloalkane or halogen-substituted alkene compound and a nickel component with a mixture of lithium aluminum hydride or at least one organo metallic compound.

---

This invention relates to the polymerization of 1,3-butadiene. In another aspect, this invention relates to a novel catalyst system for polymerizing 1,3-butadiene.

Several different catalyst systems are known in the art for the polymerization of 1,3-butadiene. New and improved catalyst systems are constantly being sought for the polymerization of 1,3-butadiene. Recently, it has been discovered that stereospecific polymers have many outstanding properties that make them particularly desirable from a commercial standpoint. Therefore, the discovery of new and improved catalyst systems to produce stereospecific polymers is a valuable contribution to the art.

It is an object of this invention to provide a process for the polymerization of 1,3-butadiene. It is another object of this invention to provide a process for producing polybutadiene that contains a high percentage of 1,4-addition. It is a further object of this invention to provide a novel catalyst system for polymerizing 1,3-butadiene.

Other aspects, advantages and objects of this invetnion will be apparent to those skilled in the art upon studying the accompanying disclosure and claims.

Broadly speaking, we have discovered a process for polymerizing 1,3-butadiene with a catalyst system comprising at least one halogen cotnaining component selected from the group consisting of aryl-substituted haloalkane compounds and halogen-substituted alkene compounds and a mixture of a nickel component and an organometallic compound or lithium aluminum hydride. By using the novel catalyst system of this invention, it is possible to produce polymers containing a high percentage of 1,4-addition.

The halogen containing components that are used in accordance with our invention are aryl-substituted haloalkanes or halogenated alkenes. The halogen-substituted alkanes will generally contain from 3 to 12 carbon atoms per molecule and whill have at least one halogen atom attached to a carbon atom which is alpha to a doubly bonded carbon atom. The aryl-substituted haloalkane compounds will generally contain from 7 to about 30 carbon atoms per molecule. It is necessary that at least one halogen atom be attached to a carbon atom in the alkane group that also has at least one aryl group attached thereto. The alkane portion of the compound will contain from 1 to 10 carbon atoms. The aryl-substituted haloalkanes are preferably phenyl haloalkanes and naphthyl haloalkanes. The halogen substituents of the foregoing compounds can be either chlorine, bromine, iodine, fluorine, or mixtures thereof. Chlorinated compounds are preferred.

Illustrative of the aryl-substituted haloalkanes that can be used in our invention are the following: benzyl chloride, benzyl bromide, benzyl iodide, benzyl fluoride, 1-(bromomethyl)naphthalene, 2-(iodomethyl)naphthalene, 1-(chloromethyl)naphthalene, diphenylchloromethane, diphenylfluoromethane, triphenylchloromethane, triphenyliodomethane, triphenylbromomethane, triphenylfluoromethane, 4-tolyliodomethane, 2,4,6-tri-n-butylphenylchloromethane, phenyl-2-naphthylchloromethane, 1-phenyl-1-chloroethane, 1,2-diphenyl-2-chloropropane, 2-phenyl-2-bromobutane, 1-(1-naphthyl)-1-chloropentane, 3-(1-naphthyl)-3-iodohexane, 1,1-diphenyl-1-fluoro-2-methylhexane, 1,3-di-(1-naphthyl)-3-chlorohexane, 2-phenyl-5-(1-naphthyl)-2-chlorodecane, 2,2-dimethyl-4,5-diphenyl-4,5-difluorononane, 1-[(3,5-di-n-hexyl)phenyl]-1-chloro-2-ethyldecane, 2-phenyl-2-iododecane, 1,2-diphenyl-2-bromo-4,5-diethylnonane, and the like.

The halogen-substituted alkene compounds that can be used in accordance with our invention are represented by the following: allyl chloride, allyl bromide, allyl iodide, allyl fluoride, 3-bromo-1-butene, 1,4-dichloro-2-butene, 1,4-diiodo-2-butene, 1,4-difluoro-2-butene, 1-chloro-2-octene, 5,8-dibromo-6-dodecene, 2,5-diiodo-3-hexene, and the like.

Mixtures of the foregoing halogen cotnaining components can also be used in accordance with our invention.

The organometallic compounds and lithium aluminum hydrides that can be used in the process of our invention are compounds having the formula $R_mAlCl_n$, $$LiAlH_xR_{(4-x)}$$

or $R_yM$ wherein R is a saturated aliphatic, saturated cycloaliphatic or aromatic radical or combinations thereof containing from 1 to 20 carbon atoms, $m$ and $n$ are integers of 1 or 2 such that $m+n=3$, $x$ is an integer of from 0 to 4, M is lithium, sodium, potassium, rubidium, cesium, beryllium, magnesium, zinc, cadmium, aluminum, gallium, or indium, and $y$ is an integer equal to the valence of M. Mixtures of the foregoing organometallic compounds can be used. Preferred organometallic compounds include trialkylaluminum compounds and lithium aluminum tetraalkyl compounds.

Examples of suitable organometallic compounds include trimethylaluminum, triethylaluminum, triisobutylaluminum, tri-n-eicosylaluminum, triphenylaluminum, ethylaluminum sesquichloride, ethylaluminum sesquichloride, lithium aluminum dimethyl dihydride, lithium aluminum butyl trihydride, lithium aluminum tri-n-decyl hydride, lithium aluminum n-eicosyl trihydride, lithium aluminum tetraethyl, lithium aluminum tetrabutyl, n-butyllithium, 4-tolylaluminum dichloride, diphenylaluminum chloride, 2-naphthyllithium, diethylmagnesium, diphenylmagnesium, trimethylgallium, diethylphenylgallium, tribenzylgallium, 4-methylcyclohexylpotassium, benzyllithium, n-eicosyllithium, phenylsodium, cyclohexylpotassium, isobutylrubidium, n-nonylcesium, diethylberyllium, diphenylberyllium, diethylzinc, dicyclopentylzinc, di-n-propylcadmium, dibenzylcadmium, trimethylindium, triphenylindium, and the like.

The nickel component used in our invention can be metallic nickel having a large surface area for its weight or a reducible nickel compound. When metallic nickel is used it should be in the form of a colloid, fine powder or porous solid such as reduced nickel adhered to carriers or Raney type nickel. The nickel compounds used in this invention are those nickel compounds that are capable of being reduced by the above-described organometallic compounds or lithium aluminum hydride. In the reduction reaction the nickel is reduced to a lower valence state. The desired reduction is accomplished by contacting the nickel compound with the above-described organometallic compound or lithium aluminum hydride. Suitable reducible nickel compounds include nickel oxide, nickel salts of inorganic acids and organic acids, nickel salts of beta-diketones of the formula:

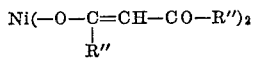

wherein R″ is a saturated aliphatic, saturated cycloaliphatic or aromatic radical or combinations thereof, containing from 1 to 10 carbon atoms, and complex compounds such as dicyclopentadienylnickel, nickel tetracarbonyl, and the nickel complex with the ethyl ester of acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutanecarboxylic acid, cyclohexanecarboxylic acid, benzoic acid, and 2-naphthoic acid. Examples of suitable nickel salft of the beta-diketones include the nickel salts of 2,4-pentanedione (acetylacetone), 3,5-heptanedione, 1,5-dicyclopentyl-2,4-pentanedione, and the like. Mixtures of the foregoing nickle components can be used.

Nickel compounds that are reduced with the lithium aluminum hydride or the organometallic compounds are preferred in the process of our invention.

It is within the scope of our invention to utilize nickel components that are supported on various carriers such as diatomaceous earth, silica-alumina, silica, alumina, titania, zirconia, kaolin, ion-exchange resins and the like. The metallic nickel or the reducible nickel compound, such as nickel oxides and the like, can be supported on the above-mentioned carriers.

The mol ratio of the halogen containing compound to the nickel is in the range of 0.5 to 10 gram mols of the halogen containing compound per gram atom of the nickel. Preferably, the mol ratio of the halogen containing compound to the nickel is in the range of 2 to 7 gram mols of halogen containing compound per gram atom of the nickel. The ratio of the nickel component to the lithium aluminum hydride or the organometallic compound is in the range of 0.25 to 6 gram atoms of nickel per gram mol of lithium aluminum hydride or organometallic compound. From 0.5 to 3 gram atoms of nickel component per gram mol of lithium aluminum hydride or organometallic compound are preferred.

The total catalyst level used in the polymerization system is based on the nickel component. Generally, the catalyst is employed in an amount such that from about 0.25 to 10 gram atoms of nickel per 100 grams of monomer is used. The preferred amount of nickel component is generally in the range of 1 to 4 gram atoms of nickel per 100 grams of monomer in the polymerization system.

The catalyst compositions used in this invention are formed by combining at least a part of the lithium aluminum hydride or the organometallic compound and the nickel component prior to introduction of the halogen containing component. The lithium aluminum hydride or the organometallic compound and the nickel component can be combined in the presence of a hydrocarbon diluent, such as the diluent used in the subsequent polymerization step.

The mixture of lithium aluminum hydride or the organometallic compound and the nickel component maintained at a temperature in the range of about 20 to 70° C. for a sufficient length of time to produce an active catalyst component. The aging time is dependent upon the particular compounds used and on the temperature of the reaction. Generally, the aging time will be in the range of about 5 minutes to about 25 hours. If a reducible nickel compound is used, it undergoes a reduction type reaction wherein the nickel is reduced to a lower valence state during the aging step. The aging step can be conveniently carried out in the polymerization reactor or in a separate catalyst preparation zone.

It has been found that when the concentrations of the lithium aluminum hydride or the organometallic compound and the nickel component are quite low, the aging time may have to be increased slightly. After the desired aging has been achieved, the halogen containing component is added to the polymerization zone and the polymerization reaction is allowed to proceed. The 1,3-butadiene monomer can be added to the polymerization zone either prior to or after the introduction of the halogen containing component.

The polymerization is generally carried out in the presence of a hydrocarbon diluent. Suitable diluents include paraffinic, cycloparaffinic and aromatic hydrocarbons such as n-pentane, n-hexane, isooctane, cyclohexane, benzene, toluene, and the like. Mixtures of the above-mentioned diluents can also be used.

It is desirable to carry out the polymerization process at a pressure such that at least a portion of the 1,3-butadiene monomer is in the liquid phase. The polymerization is usually carried out at a temperature in the range of 0 to 250° F. with a temperture in the range of 50 to 200° F. being preferred.

Various materials are detrimental to the catalyst systems of this invention. These materials include carbon dioxide, oxygen and water. It is desirable that the butadiene and polymerization diluent be freed from such impurities prior to contacting them with the catalyst. It is also desirable to remove the impurities from the reaction vessels prior to charging the various materials thereto.

Upon completion of the polymerization reaction, the reaction mixture is treated to inactivate the catalyst and recover the polymer. Any method known in the art for catalyst inactivation and polymer recovery can be used. These methods include steam stripping, alcohol coagulation and the like. It has also been found desirable to add known antioxidant materials to the polymer prior to recovery from the polymerization diluent. One suitable antioxidant is 4,4′-methylene-bis-(2,6-di-tert-butylphenol).

The polymer products produced in accordance with our invention are in some instances of relatively low molecular weight. The polymers range from viscous liquids to soft rubbers. The polybutadiene contains a high percentage of 1,4-addition. Generally, the vinyl content of the polybutadiene will be less tran about 5 percent. By proper selection of the catalyst components and polymerization conditions, it is possible to produce plymers that have a high percentage of cis-1,4-addition. In other instances, it is possible to produce polymers that contain approximately equal amounts of cis-1,4-addition and trans-1,4-addition. However, in all instances, the vinyl content of the polybutadiene produced in accordance with our invention will be less than about 5 percent.

The polymer products produced in accordance with our invention have many properties that make them valuable for a variety of commercial applications. They can be used as extenders and plasticizers for natural and synthetic rubbers, particularly for high Mooney viscosity rubbers. The polymers are vulcanizable and can be compounded and cured using conventional reinforcing agents, vulcanizing agents, vulcanization accelerators, accelerator activators, and other compounding ingredients known in the art. The low molecular weight polymers of our invention can also be utilized in adhesive and coating compositions.

It will be apparent to those skilled in the art that various modifications and changes may be made in the foregoing disclosure without departing from the scope and spirit of our invention.

The following examples are submitted to illustrate preferred embodiments to our invention. The examples should not be considered in such a way as to unduly limit the scope of our invention. Microstructure and inherent viscosity determinations in the examples were made according to the procedures shown in U.S. 3,215,682.

EXAMPLE I

Butadiene was polymerized in a series of runs in the presence of an initiator formed from nickel stearate, triethylaluminum, and triphenylchloromethane. The following recipe was used:

| | |
|---|---|
| 1,3-butadiene, parts by weight | 100 |
| Cyclohexane, parts by weight | 800 |
| Nickel stearate, mhm. | Variable |
| Triphenylchloromethane (TPC), mhm. | Variable |
| Triethylaluminum (TEA) mhm. | Variable |
| Ni stearate:TEA:TPC mol ratio | 1:3:5 | mhm.=gram millimolles per 100 grams monomer.

The nickel stearate and triethylaluminum were admixed prior to being charged to the polymerization system. The reactor containing a suspension of the nickel stearate in cyclohexane was purged with nitrogen and a solution of triethylaluminum in cyclohexane was added. The mixture was aged for about an hour at room temperature (about 76° F.).

The cyclohexane was charged first after which the reactor was purged with nitrogen. Butadiene was added followed by the nickel stearate-triethylaluminum reaction mixture. The temperature was adjusted to 122° F. and a cyclohexane solution of triphenylchloromethane was introduced. The mixture was agitated for 16 hours while the temperature was maintained at 122° F. Polymerization occurred during this period.

At the conclusion of the polymerization, the reaction was shortstopped with a 10 weight per cent solution of 2,2'-methylene-bis(4-methyl-6-tert-butylphenol) in a mixture of equal parts by weight of isopropyl alcohol and toluene. The polymers were coagulated in isopropyl alcohol, separated, and dried. All products were gel free. Results were as follows:

| Run No. | Ni stearate, mhm. | TEA, mhm. | TPC, mhm. | Conv., percent | Inherent viscosity | Microstructure, percent | | |
|---|---|---|---|---|---|---|---|---|
| | | | | | | Cis | Trans | Vinyl |
| 1 | 0.6 | 1.8 | 3.0 | 24 | 0.71 | 90.0 | 6.9 | 3.1 |
| 2 | 0.8 | 2.4 | 4.0 | 35 | 0.59 | 89.8 | 7.2 | 3.0 |
| 3 | 1.2 | 3.6 | 6.0 | 42 | 0.52 | 86.8 | 10.4 | 2.8 |

These data show that polymers prepared in the presence of the catalyst systems of this invention have a high percentage of 1,4-addition, in this case a high cis content and relatively low inherent viscosity. The products ranged from viscous liquid to a soft rubber.

EXAMPLE II

A series of runs was made wherein butadiene was polymerized with a catalyst system comprising triphenylchloromethane, nickel naphthenate, and triethylaluminum. The following recipe was used:

| | |
|---|---|
| 1,3-butadiene, parts by weight | 100 |
| Cyclohexane, parts by weight | 800 |
| Nickel naphthenate, mhm. | Variable |
| Triethylaluminum (Et₃Al), mhm. | Variable |
| Triphenylchloromethane (TPC), mhm. | Variable |

Cyclohexane was charged to the polymerization reactor first. This was followed by a nitrogen purge. Butadiene was added followed by the nickel naphthenate and triethylaluminum. After 5 minutes a cyclohexane solution of triphenylchloromethane was charged to the polymerization system and the temperature was adjusted to 122° F. The mixture was agitated throughout the polymerization period. The mixture was maintained at 122° F. for 16 hours. At the conclusion of the polymerization, the reaction was shortstopped with a 10 weight percent solution of 2,2'-methylene-bis(4-methyl-6-tert-butylphenol) in a mixture of equal parts by weight of isopropyl alcohol and toluene. The polymers were coagulated in isopropyl alcohol, separated and dried. Results are as follows:

| Catalyst components, mhm. | | | Conv., percent | Microstructure, percent | | |
|---|---|---|---|---|---|---|
| Ni Naphthenate | Et³Al | TPC | | Cis | Trans | Vinyl |
| 0.6 | 1.8 | 3.0 | 30 | 45.6 | 53.7 | 0.7 |
| 0.8 | 2.4 | 4.0 | 35 | 41.5 | 57.9 | 0.6 |
| 1.2 | 3.6 | 6.0 | 40 | 47.1 | 52.5 | 0.4 |
| 1.0 | 3.0 | 5.0 | 30 | 38.9 | 59.5 | 0.6 |
| 1.0 | 3.0 | 4.0 | 25 | 55.1 | 42.8 | 2.1 |

These data show that polymers prepared in accordance with the present invention have a high percentage of 1,4-addition. All of the polymers were of relatively low molecular weight.

We claim:

1. A catalyst composition which forms on mixing components comprising: (1) at least one halogen containing component selected from the group consisting of aryl-substituted haloalkane compounds containing from 7 to 30 carbon atoms per molecule wherein at least one halogen atom is attached to a carbon atom in the alkane group that also has at least one aryl group attached thereto or halogen-substituted alkene compounds containing from 3 to 12 carbon atoms per molecule wherein at least one halogen atom is attached to a carbon atom which is alpha to a doubly bonded carbon atom, and (2) a mixture of (a) lithium aluminum hydride or at least one organometallic compound having the formula $R_mAlCl_n$, $LiAlH_xR_{(4-x)}$ or $R_yM$ wherein R is a saturated aliphatic, saturated cycloaliphatic, or aromatic radical, or combinations thereof, containing from 1 to 20 carbon atoms, $m$ and $n$ are integers of 1 or 2 such that $m+n$ is 3, $x$ is an integer of 1 to 4, M is lithium, sodium, potassium, rubidium, cesium, beryllium, magnesium, zinc, cadmium, aluminum, gallium or indium, and $y$ is an integer equal to the valence of M and (b) a nickel component selected from the group consisting of metallic nickel having a large surface area for its weight and a reducible nickel compound capable of being reduced by said lithium aluminum hydride or said organometallic compound.

2. The composition of claim 1 wherein the ratio of said nickel component to said lithium aluminum hydride or said organometallic compound is in the range of 0.25 to 6 gram atoms of nickel per mol of lithium aluminum hydride or organometallic compound, and the ratio of said halogen containing component to said nickel component in the range of 0.5 to 10 mols of halogen containing component per gram atom of nickel.

3. The composition of claim 2 wherein said halogen containing component is a chlorine containing component.

4. The composition of claim 3 wherein said nickel component is a nickel salt of a fatty acid containing up to 40 carbon atoms and said organometallic compound is a trialkylaluminum compound.

5. The composition of claim 4 wherein said chlorine containing component is triphenylchloromethane, said nickel salt of a fatty acid is nickel stearate and said organometallic compound is triethylaluminum.

6. The composition of claim 3 wherein said nickel component is nickel naphthenate, said organometallic compound is triethylaluminum and said chlorine containing component is triphenylchloromethane.

7. A process for producing polybutadiene which comprises contacting 1,3-butadiene with the catalyst composition of claim 1.

8. The process of claim 7 wherein said contacting takes place in the presence of a diluent selected from the group consisting of paraffins, cycloparaffins and aromatic hydrocarbons and mixtures thereof at a temperature in the range of about 0° to 250° F.

9. A process for producing polybutadiene which comprises contacting 1,3-butadiene with the catalyst composition of claim 5 in the presence of a diluent selected from the group consisting of paraffins, cycloparaffins and aromatic hydrocarbons and mixtures thereof at a temperature in the range of about 0° to 250° F.

10. A process for producing polybutadiene which comprises contacting 1,3-butadiene with the catalyst composition of claim 6 in the presence of a diluent selected from the group consisting of paraffins, cycloparaffins and aromatic hydrocarbons and mixtures thereof at a temperature in the range of about 0° to 250° F.

References Cited

UNITED STATES PATENTS

| | | | |
|---|---|---|---|
| 3,032,544 | 5/1962 | Longiave | 260—94.3 |
| 3,354,139 | 11/1967 | Vandenberg | 260—94.9 |

JAMES A. SEIDLECK, Primary Examiner

R. A. GAITHER, Assistant Examiner

U.S. Cl. X.R.

252—429, 430, 431